United States Patent [19]

Arai et al.

[11] Patent Number: 4,800,610
[45] Date of Patent: Jan. 31, 1989

[54] WINDSHIELD WIPER

[75] Inventors: Masaru Arai; Itsuro Saita, both of Saitama, Japan

[73] Assignee: Nippon Wiper Blade Co., Ltd., Saitama, Japan

[21] Appl. No.: 61,544

[22] Filed: Jun. 12, 1987

[51] Int. Cl.$^4$ ............................................. B60S 1/34
[52] U.S. Cl. .................... 15/250.21; 15/250.23; 15/250.34
[58] Field of Search .......... 15/250.21, 250.23, 250.31, 15/250.33, 250.34, 250.35

[56] References Cited

U.S. PATENT DOCUMENTS

| | | | |
|---|---|---|---|
| 2,691,186 | 10/1954 | Oishei et al. | 15/250.21 |
| 2,781,540 | 2/1957 | Deibel | 15/250.21 |
| 2,878,506 | 3/1959 | Krohm | |
| 2,915,771 | 12/1959 | Ryck | |
| 2,941,230 | 6/1960 | Scriven et al. | 15/250.21 |
| 3,999,241 | 12/1976 | Mafnas | |

FOREIGN PATENT DOCUMENTS

| | | |
|---|---|---|
| 0148420 | 7/1985 | European Pat. Off. |
| 2488558 | 2/1982 | France |
| 807206 | 1/1959 | United Kingdom ............ 15/250.34 |

Primary Examiner—Peter Feldman
Attorney, Agent, or Firm—Wenderoth, Lind & Ponack

[57] ABSTRACT

A windshield wiper includes an arm head connected to a driving motor and rotatably connected to a pivot shaft, and a wiper arm supported on the arm head and connected to a wiper blade. The arm head has a first head portion rotatably supported on the pivot shaft, and a second head portion connected to the first head portion and rotatable around an axis which is generally perpendicular to the axis of the pivot shaft. A mechanism is provided for rotating the second head portion with respect to the first head portion in response to the rotation of the first head portion around the pivot shaft.

1 Claim, 5 Drawing Sheets

Fig. 5
Fig. 6
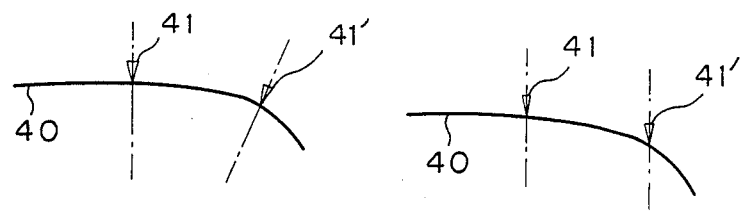
Fig. 7
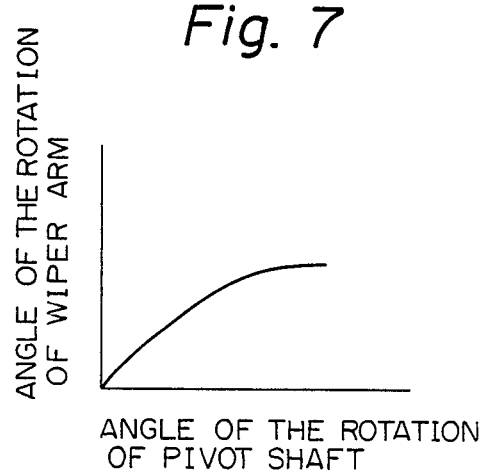

WINDSHIELD WIPER

FIELD OF THE INVENTION

The present invention relates to a windshield wiper and, particularly to the driving mechanism of a windshield wiper.

DESCRIPTION OF PRIOR ART

There have been various windshield wipers proposed for cleaning windshields of automobiles, which usually comprise an arm head reciprocatingly rotatable around a pivot shaft, a wiper arm pivotally connected to the arm head and reciprocatingly movable through a predetermined wiping angle, a wiper blade supported on the wiper arm and contacting the surface of the windshield, and an arm spring acting between the arm head and the wiper arm to bias the wiper blade against the surface of the windshield.

Recent automobiles have curved windshields for reducing aerodynamic drag and improving the appearance, which inevitably results in a change in the angle between the surface of the windshield and a rubber blade of the windshield wiper or a change in the contacting angle during the wiping stroke of the wiper. Particularly, when the windshield is sharply curved, the wiper will not act satisfactorily. Usually it is considered that the allowable range of the contacting angle is ±5 degrees.

The present invention has been made in view of the aforementioned circumstances, and aims to provide a windshield wiper having a substantially constant contacting angle on a sharply curved windshield.

SUMMARY OF THE INVENTION

According to the invention, there is provided a windshield wiper including an arm head connected to a driving motor and rotatably connected to a pivot shaft, and a wiper arm supported on the arm head and connected to a wiper blade, characterized in that the arm head comprises a first head portion rotatably supported on the pivot shaft, and a second head portion connected to the first head portion and rotatable around an axis which is generally perpendicular to the axis of the pivot shaft, and in that there is provided means for rotating the second head portion with respect to the first head portion in response to the rotational movement of the first head portion around the pivot shaft.

According to a preferred embodiment, there are provided between the first and second head portions a stationary internal gear mounted on a stationary mounting plate and having gear teeth around the pivot shaft to at least an extent corresponding to the range of reciprocating and rotating movement of the first head portion around the pivot shaft, with the internal gear meshingly engaging with a first gear rotatably supported on the first head portion, and a worm associated with the first gear and meshingly engaging with a worm gear which is fixedly formed on the second head portion, the worm gear being formed around the axis of the second head portion.

According to another embodiment, there is provided a cam on a stationary mounting plate and having a cam surface spaced a variable distance from the pivot shaft, and the cam cooperates with a cam follower displaceably mounted on the first head portion. The movement of the cam follower is transformed into the rotational movement of the second head portions through a suitable device such as a worm and worm gear. The embodiment is particularly adaptable to a windshield having a sharply curved surface on an edge portion.

BRIEF DESCRIPTION OF THE DRAWINGS

Further objects and effects of the invention will become apparent from the following detailed description in conjunction with the drawings, in which:

FIG. 5 is a schematic diagram showing the relationship between the rubber blade and the surface of windshield, according to the invention;

FIG. 6 is a view similar to FIG. 5 but showing the relationship according to the prior art, and FIG. 7 is a graph showing the relationship between the rotation of the wiper arm according to the invention with respect to the rotation of the arm head.

DETAILED DESCRIPTION OF PREFERRED EMBODIMENTS

Figure 1:
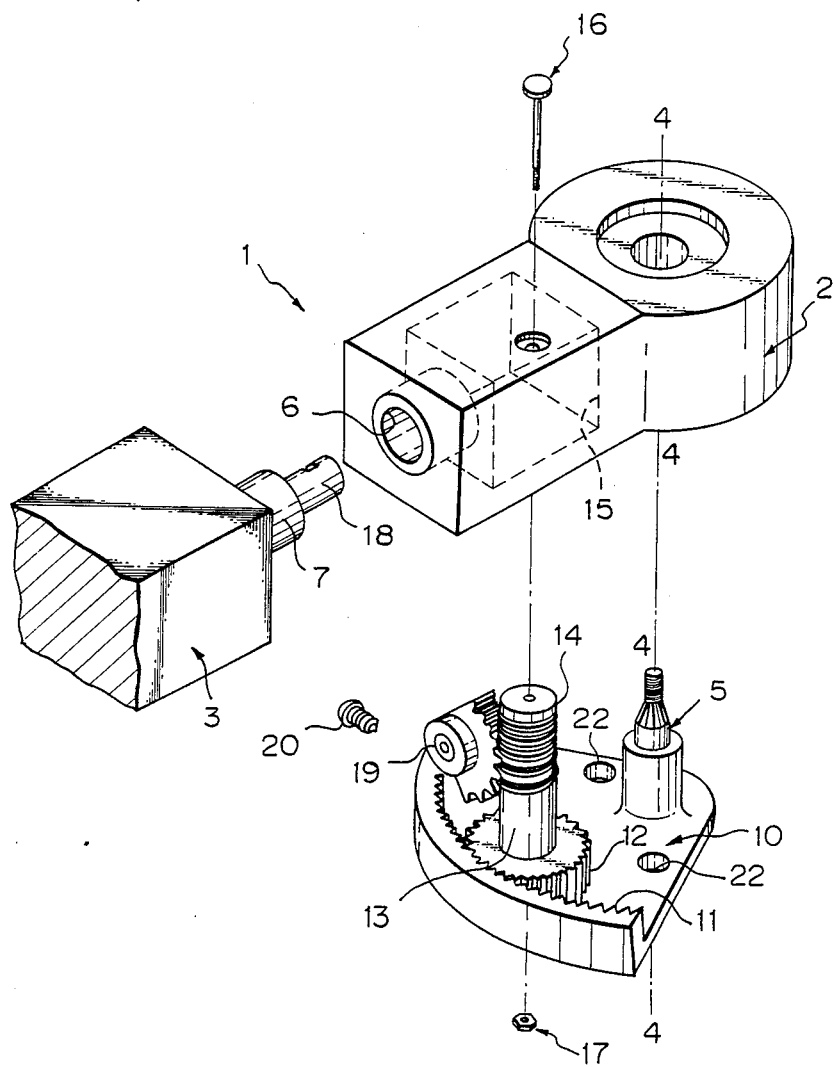
FIG. 1 is a perspective exploded view of the essential portion of a windshield wiper according to the invention.

The first embodiment according to the invention is shown in FIG. 1, and comprises an arm head 1 consisting of a first head portion 2 and a second head portion 3. A wiper blade (not shown) is mounted on the tip end portion (not shown) of the second hand portion 3. The arm head 1 is connected to a pivot shaft 5 and rotates reciprocatingly around an axis 4—4. The second head portion 3 is rotatable relative to the first head portion 2 through a shaft 7 extending within a bore 6 formed in the first head portion 2, and the axis of the shaft 7 (which is referred to as the longitudinal axis of the arm head) is generally perpendicular to the axis 4—4. When the second head portion 3 rotates, the wiper blade mounted on the second head portion rotates relative to the surface of the windshield, whereby the contacting angle of the rubber blade changes.

To rotate the second head portion 3 in response to the rotational movement of the arm head 1 around the axis 4—4 internal gear teeth 11 are provided on a stationary mounting plate 10 which is mounted on a body of a vehicle (not shown). The gear teeth 11 extend over an angular range exceeding the angular range of rotational reciprocating movement of the arm head 1 around the axis 4—4. The gear teeth 11 engage with gear teeth 12 of a first gear 13 which is rotatably supported on the first head portion 2. In the embodiment, a bore 15 open at the bottom surface of the first head portion 2 rotatably supports a shaft portion of the first gear 13, and the gear 13 is retained by a pin 16 and a nut 17, with the gear teeth 12 projecting downward from the bottom surface of the first head portion to engage with the internal gear teeth 11. The internal gear teeth prevent the accumulation of dust and the like, and are safe to handle. However, it is possible to use external gear teeth which are easy to machine, and which are compact. The shaft portion of the first gear 13 has a worm 14 which meshingly engages with a worm gear 19. The worm gear 19 is fixed to an extension 18 of the shaft 7 of the second head portion 3 by means of a screw 20.

When the first head portion 2 reciprocatingly rotates around the shaft 4—4, the first gear 13 rotates since the gear teeth 12 engage with the stationary gear teeth 11. Due to the engagement between the worm 14 and the worm gear 19, the second head portion 3 rotates relative to the first head portion 2 so that the contacting angle of the rubber blade with respect to the surface of the windshield changes. In the embodiment, the second head portion 3 rotates uniformly during the entire range of rotation of the first head portion 2, but it is possible to remove a portion of the gear teeth 11 or 12 thereby rotating the second head portion 3 at only a part of the rotational movement of the first head portion 2. The worm 14 and the worm gear 19 act to prevent incidental rotation of the second head portion 3.

Figure 2:
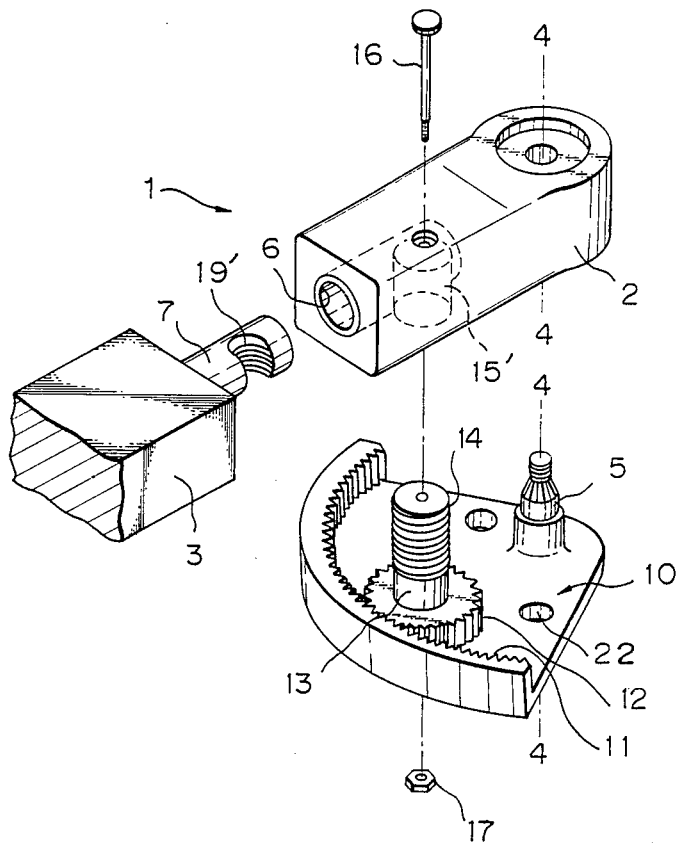
FIG. 2 is a perspective exploded view of a modified form of the windshield wiper of FIG. 1.

FIG. 2 shows a modified form of the first embodiment in which corresponding parts are denoted by the same reference numerals and a detailed description therefor is omitted. In FIG. 2, the worm gear 19' is formed directly on the shaft 7 of the second head portion 3 and engages with the worm 14 of the first gear 13. The embodiment is advantageous in reducing the size of the first head portion 2 since the same has a small sized recess 15' as compared with the recess 15 in FIG. 1. Shown at 22 in FIGS. 1 and 2 are mounting holes in the mounting plate 10.

Figure 3:
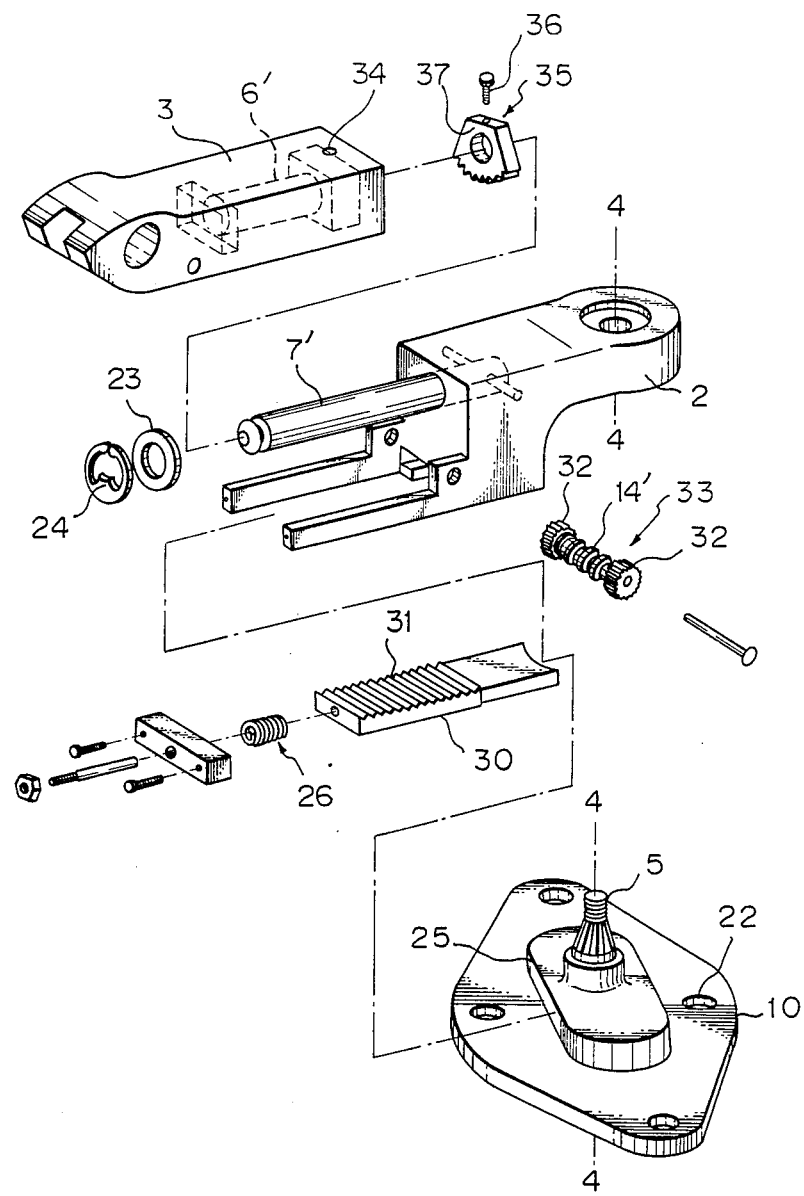
FIG. 3 is a perspective exploded view of the essential portion of a windshield wiper according to a second embodiment of the invention.

FIG. 3 shows a second embodiment of the invention in which parts corresponding to those in the first embodiment are denoted by the same reference numerals and a detailed description therefor is omitted. In FIG. 3, the second head portion 3 is supported on the first head portion 2 through a shaft 7' of the first head portion 2 extending within a bore 6' formed in the second head portion 3. The movement of the second head portion 3 in the axial direction of the shaft 7' is prevented by a washer 23 and a clip 24. The mounting plate 10 has a cam defining a cam surface 25 which cooperates with a follower 30 slidably mounted on the first head portion 2 for sliding in directions toward and away from the cam surface 25. A spring 26 urges the follower 30 against the cam surface 25. Gear teeth 31 are formed on the upper surface of the follower 30, and engage with gear teeth 32 of a gear 33 which is rotatably supported on the first head portion 2. The gear 33 also has worm 14' for engaging with a worm gear 35 secured to the second head portion 3 through an opening 34 and with a screw 36. The gear 35 has a bore 37 for allowing the shaft 7' to pass therethrough.

In the embodiment, it is possible to determine the relationship between the rotational position of the arm head 1 and the second head portion 3 as desired by changing the configuration of the cam surface 25. Thus, the wiper is particularly adaptable to a windshield having a sharply curved edge portion.

Figure 4:
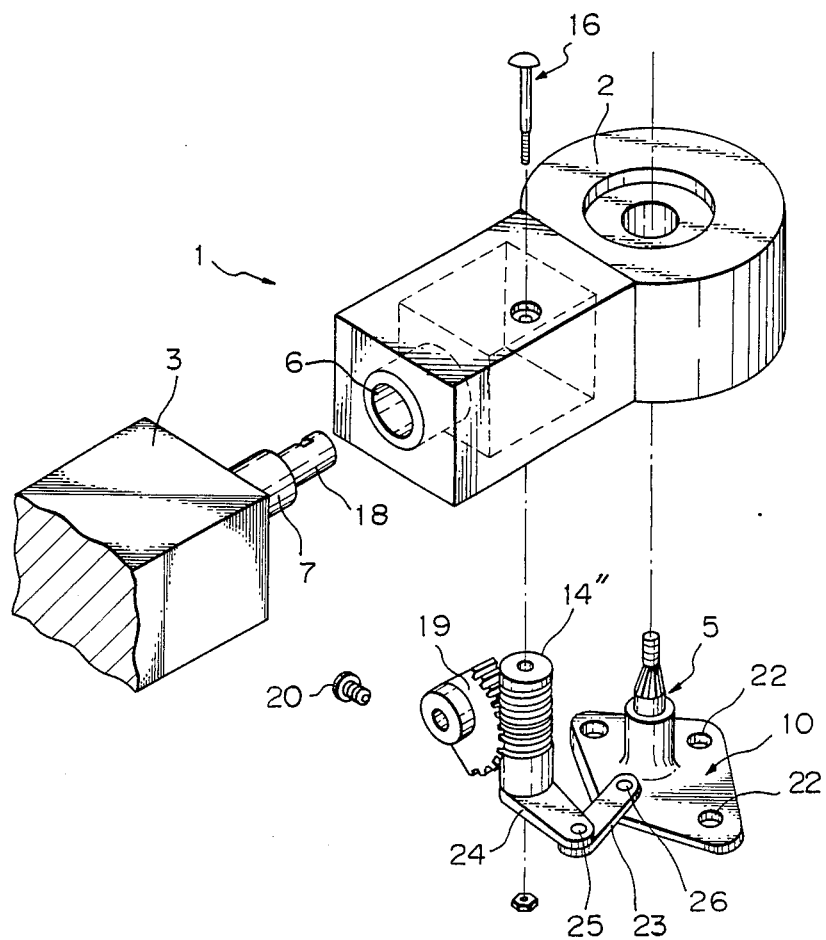
FIG. 4 is a perspective exploded view of a windshield wiper according to a third embodiment of the invention.

FIG. 4 shows a third embodiment, wherein mutually engaging worm 14" and worm gear 19 are provided in the first head portion 2, with the axis of the worm 14" extending parallel to the axis of the pivot shaft 5 and the worm gear 19 secured to the second head portion 3 similarly to the first embodiment. A link arm 24 is secured to the worm 14" and is pivotally connected to a link arm 23 which is pivotally mounted on the stationary mounting plate 10. The embodiment has a simple construction, but it is possible to change the relation between the rotation of the pivot shaft 5 and that of the second head portion 3 as desired.

FIGS. 5 and 6 show the relationship between the rubber blade and the surface of the windshield according to the invention (FIG. 5) and prior art (FIG. 6), in which the surface of the windshield is shown at 40, and 41 and 41' show the rubber blade at two different positions.

FIG. 7 shows one example of the relationship between the rotation of the pivot shaft and that of the second head portion according to the invention.

As described heretofore, according to the invention, it is possible to change the contacting angle of the rubber blade during the reciprocatingly rotating motion of the wiper arm. Thus, it is possible to improve the cleaning characteristics of the wiper and to prevent excessive wear of the rubber blade.

What is claimed is:

1. A windshield wiper comprising:
    a rotable pivot shaft having a rotational axis;
    an arm head mounted to said pivot shaft for reciprocatingly rotating about the rotational axis thereof,
    said arm head comprising a first head portion connected to said pivot shaft, a second head portion rotatably mounted to said first head portion about a second rotational axis extending generally perpendicular to the axis of rotation of said pivot shaft, and rotating means for rotation said second head portion about said second rotational axis,
    said rotating means comprising a worm operatively connected to said first head portion, a worm gear fixed to said second head portion and engaging said worm for rotating to rotate said second head portion about said second rotational axis when said worm rotates, a stationary mounting plate, and a linkage mechanism operatively connected between said worm and said stationary mounting plate for selectively rotating said worm as said arm head rotates about the rotational axis of said pivot shaft,
    said linkage mechanism comprising a first link having one end fixedly connected to said worm, and a second link having one end pivotably connected to said stationary mounting plate and the other end pivotably connected to the other end of said first link.

* * * * *